Feb. 4, 1936. G. HAGLUND 2,029,616
PROCESS FOR PREPARING ALKALI SULPHITE OR ALKALI BISULPHITE
SOLUTIONS FROM WASTE LIQUORS OBTAINED IN THE DIGESTION
OF CELLULOSE WITH ALKALI SULPHUR COMPOUNDS
Filed April 10, 1931
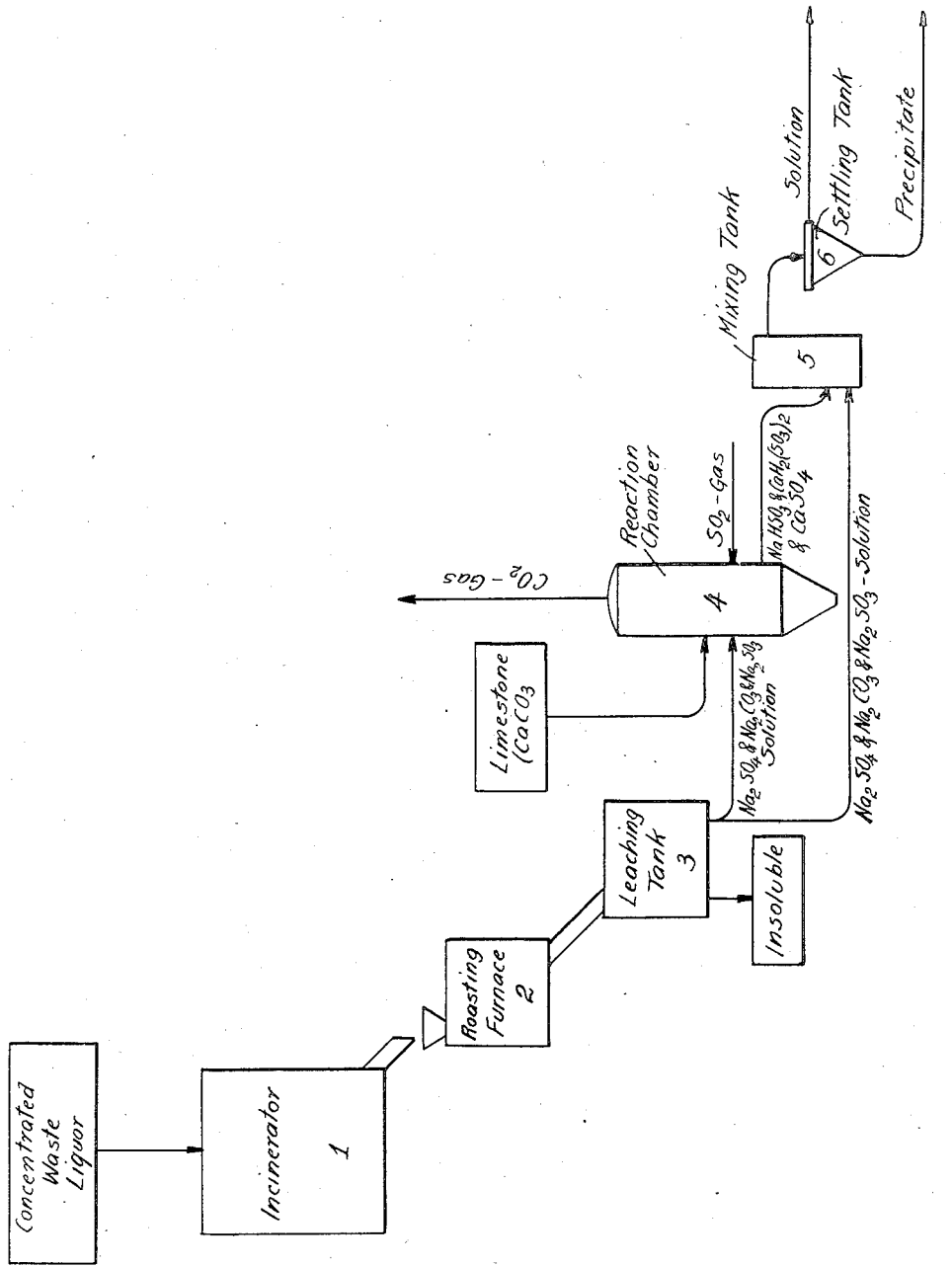
INVENTOR
GUSTAF HAGLUND
BY
Pennie, Davis, Marvin & Edmonds
ATTORNEYS Patented Feb. 4, 1936

2,029,616

UNITED STATES PATENT OFFICE 2,029,616

PROCESS FOR PREPARING ALKALI SULPHITE OR ALKALI BISULPHITE SOLUTIONS FROM WASTE LIQUORS OBTAINED IN THE DIGESTION OF CELLULOSE WITH ALKALI SULPHUR COMPOUNDS

Gustaf Haglund, Stockholm, Sweden, assignor to Patentaktiebolaget Gröndal-Ramen, Stockholm, Sweden Application April 10, 1931, Serial No. 529,300
In Germany January 16, 1931

11 Claims. (Cl. 23—129)

The present invention relates to the preparation of alkali metal sulphite or alkali metal bisulphite solutions from waste liquors obtained in the digestion of cellulose with alkali sulphur compounds, and has for an object the provision of an improved method of preparation wherein the solutions obtained are substantially free of substances which would hinder the digestion of cellulose by such solutions.

The waste liquor is first incinerated in the known manner to burn off the organic matter and leave a fused mass containing various alkali metal compounds.

The nature and proportions of the alkali metal compounds in the masses so obtained vary rather widely. One such mass, for example, obtained upon incinerating waste liquor from a sulphite cellulose digestion in which sodium bisulphite and an excess of sulphur dioxide were used as cooking liquor, had the following composition: $Na_2CO_3 + NaOH$ 20.9%, $Na_2S$ 26.4%, $Na_2SO_3$ 1.2%, $Na_2S_2O_3$ 6.1%, $Na_2SO_4$ 32.6%, insoluble in water 12.4%, total 99.6%.

Another, obtained upon incinerating waste liquor from a sulphate cellulose digestion had the following composition: $Na_2CO_3 + NaOH$ 73.6%, $Na_2S$ 10.9%, $Na_2SO_3$ 1.5%, $Na_2S_2O_3$ 1.3%, $Na_2SO_4$ 4.7%, insoluble in water 4.7%, total 96.7%.

Among the constituents of these masses, however, are usually included sulphides and thiosulphates the presence of which in sulphite digestion solutions would be objectionable, and consequently they must first be removed or converted to a more suitable form. It is generally recognized that the addition of sulphur dioxide to an aqueous solution of the alkali metal salts of these masses, will not result in the conversion of the sulphide and thiosulphate to a suitable form, although it may be effective in so far as carbonate and hydrate for example, are concerned. Accordingly, some other treatment must be resorted to before a suitable sulphite or bisulphite solution can be produced.

One method which I have found to be quite effective consists in grinding up the fused mass from the incineration and roasting to convert the sulphides and thiosulphates to sulphites and sulphates. The resulting product may then consist for example of sodium carbonate, sodium sulphite, sodium sulphate, and possibly to some extent of sodium hydrate. The roasting of an incinerated mass of the nature indicated in the first example above, resulted in the following composition: $Na_2CO_3$ 18.00%, $Na_2S$ 0.2%, $Na_2SO_3$ 29.2%, $Na_2S_2O_3$ 0.8%, $Na_2SO_4$ 40.0% and insolubles in water 12.2%.

While the roasted product still contains some sulphide and thiosulphate, the amounts thereof are so insignificant that their effect in a sulphite or bisulphite digesting solution would be negligible.

The roasting operation is preferably carried out as follows:—The finely ground incinerated mass is roasted in air to oxidize the sulphides and decompose the thiosulphates, and the operation is carried out at a temperature below the sintering point of the mass (which is usually in the general neighborhood of 500° C. although subject to some variation) but substantially above the decomposition temperature of the thiosulphate which is approximately 240° C. Under such conditions the conversion of the sulphide and thiosulphate into sulphite and sulphate proceeds rapidly and thoroughly. The roasting of these compounds to oxidize the sulphide and decompose the thiosulphate are not unfavorably influenced by the presence of furnace gases such as carbon dioxide and sulphur dioxide and consequently in commercial operation, the roasting may, if desired, be conducted in the presence of such hot gases, which are passed over or through the mass to be roasted. The combustion gases from a waste liquor incinerator, for example, may be so used, or the gases from a heating plant or other furnace.

After completion of the roasting, the residual mass is leached with water to dissolve the alkali metal salts.

Instead of roasting the incinerated mass, it may, if desired, be otherwise treated to eliminate the objectionable sulphide and thiosulphate forms, for example by first dissolving the alkali metal salts of the incinerated mass and proceeding by means of a suitable wet process to convert the sulphide and thiosulphate to a suitable form or otherwise eliminate them. Whatever the sulphide and thiosulphate treatment may be, it is assumed for the purposes of the following illustrative procedure, that the resulting solutions are practically free from these undesirable sulphur compounds and contain the alkali metal principally in the form of carbonate, sulphite, sulphate and possibly hydrate.

The solution of the latter alkali metal compounds, after first being subjected to a concentrating operation if it is unduly dilute, is then divided into two portions which will be referred to as solutions A and B. To solution A, sulphur dioxide is added to obtain a solution C in which the alkali metal carbonate and sulphite of solution A have been converted to bisulphite.

In addition to the sulphur dioxide, finely crushed limestone or other finely divided calcium carbonate is introduced into the solution either in direct conjunction with the sulphur dioxide or separately therefrom. As a result calcium bisulphite is formed by the action of the sulphur dioxide on the calcium carbonate, and proceeds to combine with the sodium sulphate to form sodium bisulphite and calcium sulphate. The calcium carbonate and the sulphur dioxide should be added in sufficient quantity and the action permitted to continue until substantially all of the sulphate present is in the form of calcium sulphate. Furthermore, the calcium carbonate and sulphur dioxide are also added in suitable excess to provide sufficient calcium bisulphite for the production of the desired amount of alkali metal bisulphite in subsequent phases of the procedure.

The solution C resulting from the treatment of solution A as in the manner described, will thus contain substantially all of the alkali metal in the form of bisulphite, and in addition calcium bisulphite and calcium sulphate to the extent of its solubility in the solution, and possibly some small amount of free sulphur dioxide.

This solution C is then treated with solution B, the second portion of the original solution, and the relative quantities of solutions A and B are dictated by the quantity of solution B required to render solution C substantially free of calcium salts, and yield a resulting solution D containing the alkali metal in the form of sulphite and bisulphite, together with some small amount in the form of sulphate.

As noted hereinbefore solution B will contain alkali metal carbonate, sulphite, sulphate and possibly hydrate.

When this solution is admixed with solution C, various reactions take place which result in the conversion of the constituents of solution B to alkali metal sulphite and bisulphite, together with some small amount of alkali metal sulphate although considerably less than it was in solution B, and will also result in the substantially complete liberation of the solution from calcium by the formation of calcium carbonate and sulphate.

The resulting solution D is then filtered, and the filtrate containing the alkali metal sulphite and bisulphite may then be treated with sulphur dioxide to convert the sulphite either wholly or partly to bisulfite prior to use for cellulose digestion, or the solution may be used directly for that purpose without sulphur dioxide treatment.

In carrying out the various steps noted, it is desirable to utilize solutions which are as highly concentrated as possible. This will result not only in a more effective treatment, but will yield more highly concentrated solutions of sulphite and bisulphite which will have to be diluted to many times their volume before being used for the cellulose digestion, as the result of which, the small proportion of undesirable compounds will be still further reduced.

If the original solution from which solutions A and B are apportioned, should consist of alkali metal hydrate, alkali metal sulphite and alkali metal sulphate with little or no alkali metal carbonate, the procedure will be conducted in substantially the same fashion except that the calcium which is separated in solution D will be principally in the form of calcium sulphite and calcium sulphate.

Other circumstances may likewise arise which require that the calcium be removed from the solution in forms other than as calcium carbonate, for example, as calcium sulphite and/or sulphate. As an illustration, it is generally desirable to conduct the operation which results in the production of solution C, to use the calcium carbonate and the sulphur dioxide in such quantity that calcium bisulphite in excess of that theoretically required to react with the soluble sulphate to form calcium sulphate, will be present in the solution. This will aid appreciably in carrying to a greater degree of completion, the reaction which removes the soluble sulphate from the solution in the form of calcium sulphate. This excess may, if desired, be in such quantity that solution C at the end of the operation will contain calcium bisulphite to the point of saturation.

If under such circumstances, it should be the case that the original solution contained little or no carbonate but consisted principally of alkali metal sulphate and/or sulphite, for example, then solution B will be so apportioned relative to solution A, that the quantity of sulphate and/or sulphite in solution B will serve to react with the excess calcium bisulphite to yield insoluble calcium sulphite and/or sulphate.

The single figure of the accompanying drawing is a flow sheet illustrating a preferred process of the invention. According to the process illustrated by the flow sheet, concentrated waste liquor is introduced into an incinerator 1 in which the remaining water is evaporated and the organic matter is oxidized and thus eliminated. The resulting fused mass is ground and conveyed to a roasting furnace 2 in which sulphides and thiosulphates are converted to sulphites and sulphates. The product of the roasting operation is transferred to a leaching tank 3 in which the alkali metal salts contained in the product are placed in water solution.

A portion of the resulting solution is subjected to the action of sulphur dioxide and finely divided limestone ($CaCO_3$) in a suitable reaction chamber 4 until the alkali metal compounds have been converted to bisulphite. Another portion of the solution is added to the bisulphite solution thus formed in a suitable precipitating or mixing tank 5. The resulting mixture is conducted to a settling tank 6 in which the solution and the precipitate are separated.

I claim:

1. The method of preparing alkali metal salts of sulphurous acid from waste liquor resulting from the digestion of cellulose with alkali sulphur compounds, which comprises, separating the alkali metal compounds from the organic matter in the waste liquor, converting any sulphide and/or thiosulphate therein to a form which is unobjectionable in the digestion of cellulose, suitably apportioning a solution of the alkali metal compounds into two parts, converting the alkali metal compounds in one part of the solution to bisulphite and converting soluble sulphate in the solution to calcium sulphate, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

2. The method of preparing alkali metal salts of sulphurous acid from waste liquor resulting from the digestion of cellulose with alkali sulphur compounds, which comprises, separating the alkali metal compounds from the organic matter in the waste liquor, converting any sulphide and/or thiosulphate therein to sulphite and sulphate, suitably apportioning a solution of the alkali metal compounds into two parts, converting the alkali metal compounds in one part of the solution to bisulphite and converting soluble sulphate in the solution to calcium sulphate, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

3. The method of preparing alkali metal salts of sulphurous acid from waste liquor resulting from the digestion of cellulose with alkali sulphur compounds, which comprises, incinerating the waste liquor to free the alkali metal compounds therein from the accompanying organic matter, roasting the incinerated product to convert any sulphide and/or thiosulphate therein to sulphite and sulphate, forming an aqueous solution of the alkali metal compounds from the roasting operation, suitably apportioning the solution into two parts, converting the alkali metal compounds in one part of the solution to bisulphite and converting soluble sulphate in the solution to calcium sulphate, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

4. The method of preparing alkali metal salts of sulphurous acid from waste liquor resulting from the digestion of cellulose with alkali sulphur compounds, which comprises, separating the alkali metal compounds from the organic matter in the waste liquor, converting any sulphide and/or thiosulphate therein to a form which is unobjectionable in the digestion of cellulose, suitably apportioning a solution of the alkali metal compounds into two parts, converting the alkali metal compounds in one part of the solution to bisulphite and treating said solution with a salt of calcium more soluble than calcium sulphate to convert sulphate in the solution to calcium sulphate, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

5. The method of preparing alkali metal salts of sulphurous acid from waste liquor resulting from the digestion of cellulose with alkali sulphur compounds, which comprises, separating the alkali metal compounds from the organic matter in the waste liquor, converting any sulphide and/or thiosulphate therein to sulphite and sulphate, suitably apportioning a solution of the alkali metal compounds into two parts, treating one part of the solution with calcium carbonate and sulphur dioxide to convert the alkali metal compounds to bisulphite and the sulphate in the solution to calcium sulphate, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

6. The method of preparing alkali metal salts of sulphurous acid from waste liquor resulting from the digestion of cellulose with alkali sulphur compounds, which comprises, separating the alkali metal compounds from the organic matter in the waste liquor, converting any sulphide and/or thiosulphate therein to sulphite and sulphate, suitably apportioning a solution of the alkali metal compounds into two parts, treating one part of the solution with calcium carbonate and sulphur dioxide to convert the alkali metal compounds to bisulphite and convert the sulphate in the solution to calcium sulphate, said calcium carbonate and sulphur dioxide being added in such proportion that the solution so treated will also contain calcium bisulphite, and mixing the solution so obtained with the second part of the original solution which is apportioned in such quantity relative to the first part that the combined calcium of said bisulphite solution is rendered more insoluble and a solution containing alkali metal sulphite and bisulphite is obtained.

7. The process for preparing a solution of alkali metal salts of sulphurous acid from waste liquor resulting from a cellulose digestion process employing cooking liquor containing alkali metal sulphur compounds, which comprises treating the waste liquor to eliminate organic compounds and to form a solution of alkali metal compounds containing an alkali metal sulphate and substantially free from sulphides and thiosulphates, subjecting the solution to the action of sulphur dioxide and one or more calcium compounds capable of reacting with sulphurous acid to form calcium bisulphite until the alkali metal salts contained in the solution have been converted to bisulphites, and subjecting the resulting solution to the action of one or more alkali metal compounds capable of reacting with calcium bisulphite to form one or more insoluble calcium compounds.

8. The process for preparing a solution of alkali metal salts of sulphurous acid from waste liquor containing organic compounds and alkali metal salts including a sulphide, a thiosulphate and a sulphate resulting from a cellulose digestion process employing cooking liquor containing alkali metal sulphur compounds, which comprises treating the waste liquor to eliminate organic compounds and to form a solution of alkali metal compounds containing alkali metal sulphate and substantially free from sulphides and thiosulphates, subjecting the solution to the action of sulphur dioxide and one or more calcium compounds capable of reacting with sulphurous acid to form calcium bisulphite until the alkali metal sulphate is converted to bisulphite with the production of calcium sulphate, the amount of calcium compound employed being in excess of the theoretical amount required for conversion of the alkali metal sulphate to bisulphite, whereby an excess of calcium bisulphite is formed and remains in the solution, and subjecting the resulting solution to the action of one or more alkali metal compounds capable of reacting with calcium bisulphite to form one or more insoluble calcium compounds, thereby to effect the removal of calcium bisulphite from the solution.

9. The process for preparing a solution of alkali metal salts of sulphurous acid from waste liquor resulting from a cellulose digestion process employing cooking liquor containing alkali metal sulphur compounds, which comprises concentrating and incinerating the waste liquor to remove water and combustible organic material and to form a fused product containing alkali metal sulphate, sulphide and thiosulphate, roasting the fused product of the incinerating operation to oxidize the sulphide and decompose the thiosulphate, forming an aqueous solution of the resulting roasted product, and subjecting the solution to the action of sulphur dioxide and one or more calcium compounds capable of reacting with sulphurous acid to form calcium bisulphite until the alkali metal salts contained in the solution have been converted to bisulphites.

10. The process for preparing a solution of alkali metal salts of sulphurous acid from waste liquor resulting from a cellulose digestion process employing cooking liquor containing alkali metal sulphur compounds, which comprises concentrating and incinerating the waste liquor to remove water and combustible organic material and to form a fused product containing alkali metal sulphate, sulphide and thiosulphate, roasting the fused product of the incinerating operation to oxidize the sulphide and decompose the thiosulphate, forming an aqueous solution of the resulting roasted product, subjecting the solution to the action of sulphur dioxide and one or more calcium compounds capable of reacting with sulphurous acid to form calcium bisulphite until the alkali metal salts contained in the solution have been converted to bisulphites, and subjecting the resulting solution to the action of one or more alkali metal compounds capable of reacting with calcium bisulphite to form one or more insoluble calcium compounds.

11. The process for preparing a solution of alkali metal salts of sulphurous acid from waste liquor containing organic compounds and alkali metal salts including a sulphide, a thiosulphate and a sulphate resulting from a cellulose digestion process employing cooking liquor containing alkali metal sulphur compounds, which comprises concentrating and incinerating the waste liquor to remove water and combustible organic matter and to form a fused product containing the alkali metal salts, roasting the fused product to oxidize the sulphide and decompose the thiosulphate, forming an aqueous solution of the resulting roasting product, subjecting the solution to the action of sulphur dioxide and one or more calcium compounds capable of reacting with sulphurous acid to form calcium bisulphite until the alkali metal sulphate is converted to bisulphite with the production of calcium sulphate, the amount of calcium compound employed being in excess of the theoretical amount required for conversion of the alkali metal sulphate to bisulphite, whereby an excess of calcium bisulphite is formed and remains in the solution, and subjecting the resulting solution to the action of one or more alkali metal compounds capable of reacting with calcium bisulphite to form one or more insoluble calcium compounds, thereby to effect the removal of calcium bisulphite from the solution.

GUSTAF HAGLUND.